US012803226B2

(12) United States Patent
Stack et al.

(10) Patent No.: US 12,803,226 B2
(45) Date of Patent: Nov. 17, 2026

(54) SHIELD FORMED FROM DIECAST HALVES DISPOSED AROUND AN OUTER CONTACT AND CONNECTOR SYSTEM USING THE SAME

(71) Applicant: TE Connectivity Solutions GmbH, Schaffhausen (CH)

(72) Inventors: Daniel Stack, Winston Salem, NC (US); William John Remaley, Winston Salem, NC (US); David Alan College, Middletown, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 651 days.

(21) Appl. No.: 18/311,930

(22) Filed: May 4, 2023

(65) Prior Publication Data

US 2024/0372300 A1 Nov. 7, 2024

(51) Int. Cl.

| | |
|---|---|
| ***H01R 13/6581*** | (2011.01) |
| ***H01R 13/648*** | (2006.01) |
| ***H01R 13/6591*** | (2011.01) |
| ***H01R 13/6593*** | (2011.01) |
| *H01R 13/02* | (2006.01) |
| *H01R 13/658* | (2011.01) |
| *H01R 13/6592* | (2011.01) |

(52) U.S. Cl.

CPC ....... *H01R 13/6581* (2013.01); *H01R 13/648* (2013.01); *H01R 13/65912* (2020.08); *H01R 13/6593* (2013.01); *H01R 13/02* (2013.01); *H01R 13/658* (2013.01); *H01R 13/6591* (2013.01); *H01R 13/65915* (2020.08); *H01R 13/65917* (2020.08); *H01R 13/65918* (2020.08); *H01R 13/6592* (2013.01)

(58) Field of Classification Search

CPC .......... H01R 13/6581; H01R 13/65912; H01R 13/6593; H01R 13/648; H01R 13/658; H01R 13/6591; H01R 13/65915; H01R 13/65917; H01R 13/65918; H01R 13/6592; H01R 13/02

See application file for complete search history.

(56) References Cited

U.S. PATENT DOCUMENTS 11,362,466 B2 * 6/2022 Droesbeke ............. H01R 4/029

FOREIGN PATENT DOCUMENTS

CN 111342309 A * 6/2020 ........... H01R 13/502

* cited by examiner

*Primary Examiner* — Justin M Kratt

(57) ABSTRACT

A shield of a connector system includes an outer contact and a diecast disposed around the outer contact. The diecast has a first diecast half and a second diecast half that are attached together around the outer contact in a terminated position of the diecast. The first diecast half and the second diecast half deform a beam of the outer contact between the first diecast half and the second diecast half in the terminated position. A first bottoming surface of the first diecast half abuts a second bottoming surface of the second diecast half in the terminated position.

31 Claims, 9 Drawing Sheets

SHIELD FORMED FROM DIECAST HALVES DISPOSED AROUND AN OUTER CONTACT AND CONNECTOR SYSTEM USING THE SAME

FIELD OF THE INVENTION

The present invention relates to a connector system and, more particularly, to a shield of a connector system.

BACKGROUND

A connector system commonly includes a dielectric having at least one contact and a shield disposed around the dielectric. The shield can include an outer contact disposed on the dielectric and a diecast disposed around and electrically connected to the outer contact; the diecast secures a positioning of the outer contact on the dielectric and electrically connects the outer contact to other elements of the shield.

The diecast can be formed in a single piece and positioned around the outer contact. Sizing the single piece diecast to receive the outer contact and other elements of the connector system, however, leads to difficult positional tolerances in manufacturing and results in an imprecise fit between the diecast and the outer contact, which impairs the functioning of the shield. The diecast can alternatively be formed in two different pieces and crimped together; this arrangement, though, is difficult to control and can result in under-compression or over-compression of the diecast on the outer contact, which can also impair the functioning of the shield.

SUMMARY

A shield of a connector system includes an outer contact and a diecast disposed around the outer contact. The diecast has a first diecast half and a second diecast half that are attached together around the outer contact in a terminated position of the diecast. The first diecast half and the second diecast half deform a beam of the outer contact between the first diecast half and the second diecast half in the terminated position. A first bottoming surface of the first diecast half abuts a second bottoming surface of the second diecast half in the terminated position.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
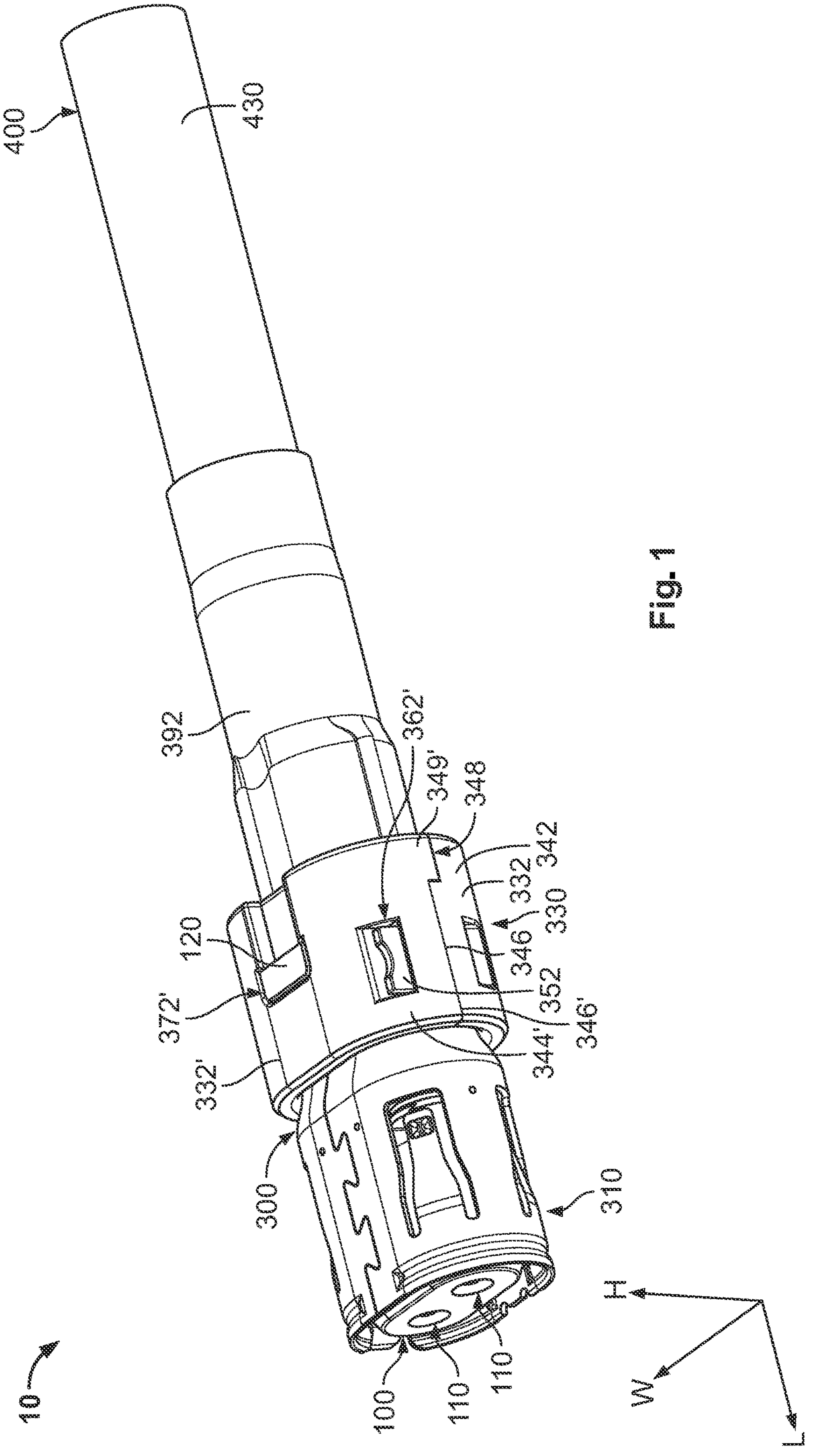
FIG. 1 is a perspective view of a connector system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as “longitudinal direction”, “height direction”, and “width direction”. These descriptors are merely for clarity of the description and for differentiation of the various directions. These directional descriptors do not imply or require any particular orientation of the disclosed elements.

A connector system 10 according to an embodiment is shown in FIG. 1. The connector system 10, as shown in FIGS. 1 and 2, includes a dielectric 100, a plurality of inner contacts 200 disposed in the dielectric 100, a shield 300 disposed around the dielectric 100, and a cable 400 extending through the shield 300 and electrically connected with the shield 300 and the inner contacts 200 in the dielectric 100.

Figure 2:
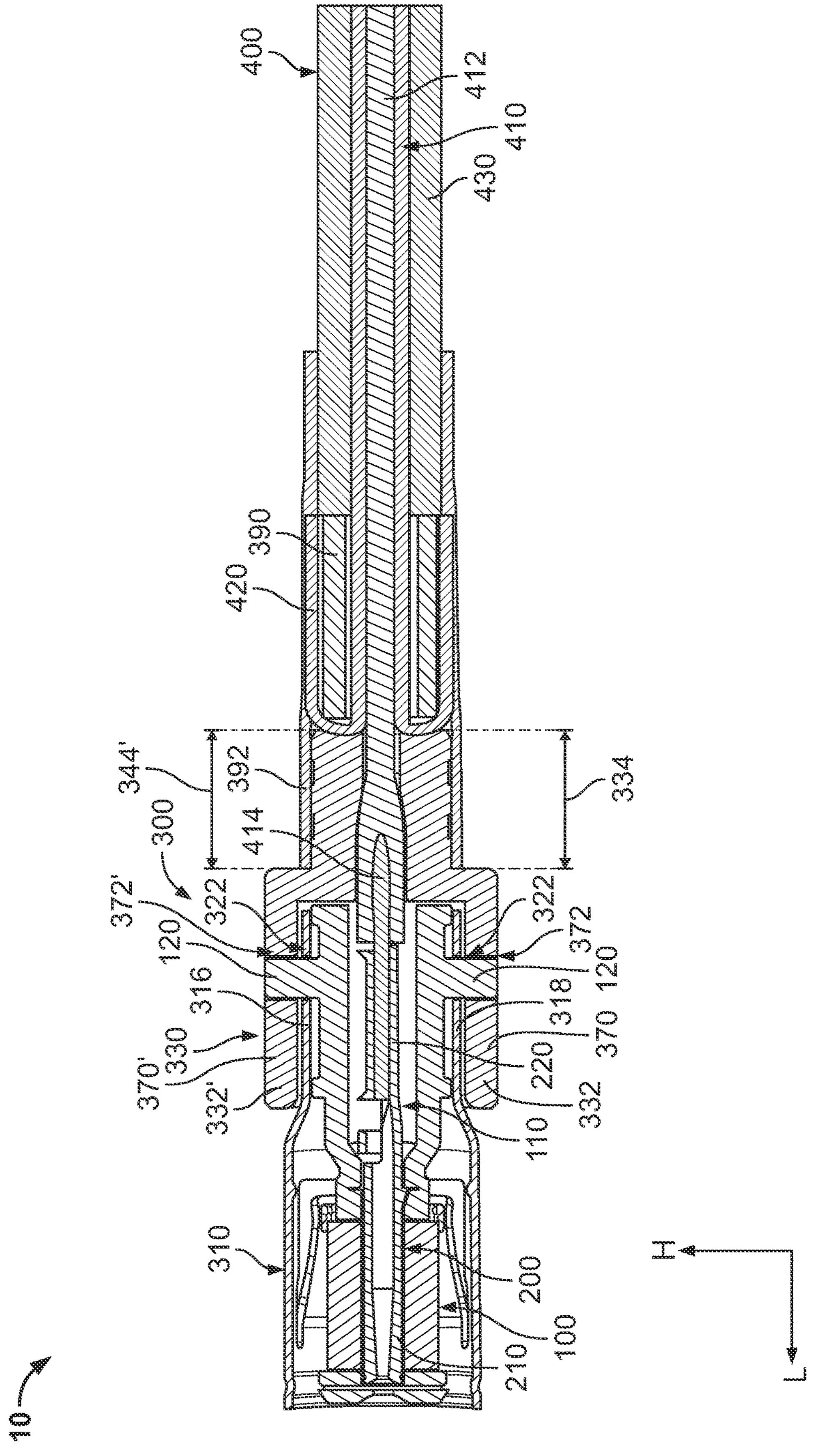
FIG. 2 is a sectional side view of the connector system.

The dielectric 100, as shown in FIGS. 1 and 2, has a plurality of contact passageways 110 extending through the dielectric 100 along a longitudinal direction L. In the shown embodiment, the dielectric 100 has two contact passageways 110 extending through the dielectric 100. In other embodiments, the dielectric 100 may have one, or three or more contact passageways 110 extending through the dielectric 100, provided that the number of contact passageways 110 is equal to the number of inner contacts 200 of the connector system 10. In the embodiment shown in FIGS. 1 and 2, the dielectric 100 has a pair of dielectric protrusions 120 extending from opposite sides of the dielectric 100 in a height direction H perpendicular to the longitudinal direction L. In other embodiments, the dielectric protrusions 120 could be omitted.

The dielectric 100 is formed of an electrically insulative material, such as a plastic. In the shown embodiment, the dielectric 100 is monolithically formed in a single piece. In another embodiment, the dielectric 100 may be formed of a plurality of pieces and assembled together to form the elements of the dielectric 100 described above.

Figure 9:
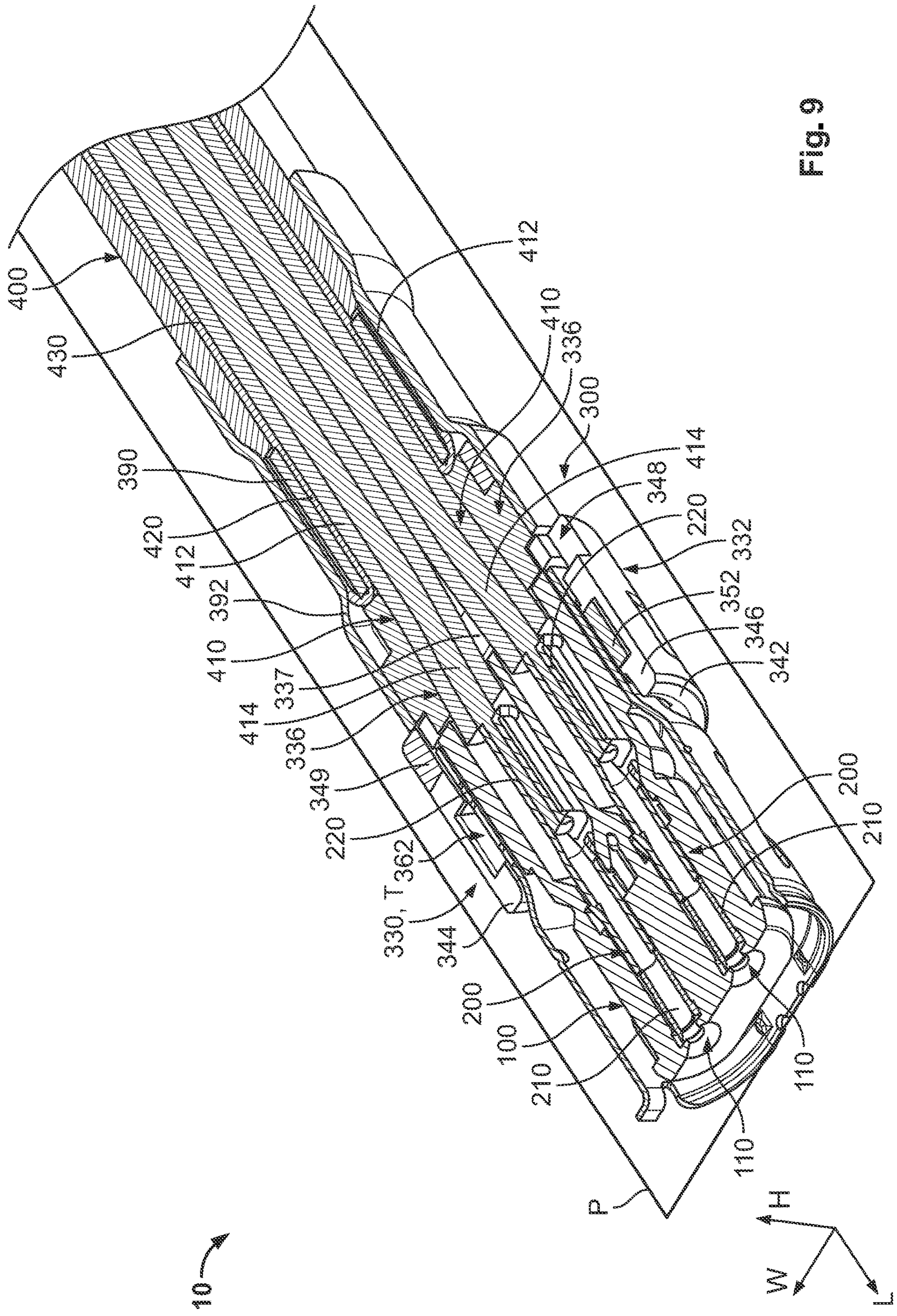
FIG. 9 is as sectional perspective view of the connector system in the terminated position.

The inner contacts 200, as shown in FIGS. 2 and 9, have a mating end 210 and a connection end 220 opposite the mating end 210 in the longitudinal direction L. The inner contact 200 is formed of a conductive material and may be monolithically formed in a single piece or formed from a plurality of separate pieces assembled together. In the shown embodiment, the connection end 220 of the inner contact 200 is a crimp and the mating end 210 is a socket. In other embodiments, the mating end 210 may be a pin and the connection end 220 may be any type of element that can form a mechanical and electrical connection between the inner contact 200 and a conductor. The number of inner contacts 200 of the connector system 10, two in the shown embodiment, corresponds to the number of contact passageways 110 in the dielectric 100.

The shield 300 includes an outer contact 310, a diecast 330 disposed around the outer contact 310, an inner ferrule 390, and an outer ferrule 392, as shown in FIGS. 1 and 2. The outer contact 310 and the diecast 330 of the shield 300 will now be described in greater detail primarily with reference to FIGS. 3-5.

Figure 3:
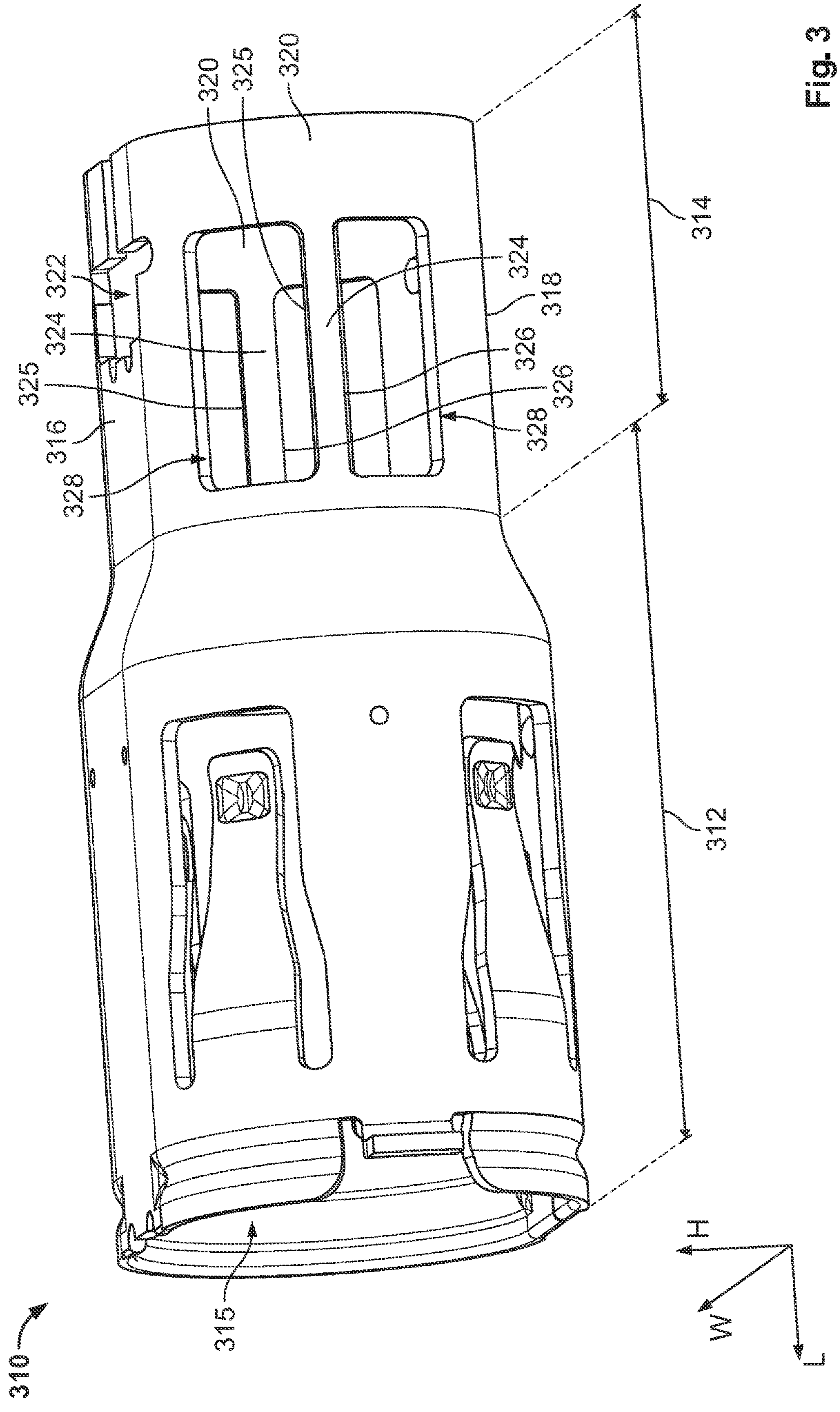
FIG. 3 is a perspective view of an outer contact of a shield of the connector system.

As shown in FIG. 3, the outer contact 310 has a mating section 312 and a connection section 314 extending from the mating section 312. The mating section 312 and the connection section 314 define a receiving space 315 of the outer contact 310. The connection section 314, as shown in FIG. 3, has an upper surface 316 and a lower surface 318 opposite the upper surface 316 in the height direction H. The connection section 314 has a pair of sides 320 extending approximately in the height direction H and connecting the upper surface 316 and the lower surface 318. A shield recess 322 extends through each of the upper surface 316 and the lower surface 318, as shown in FIGS. 2 and 3.

On each of the sides 320, the connection section 314 has a beam 324 disposed between a pair of openings 328, as shown in FIG. 3. The beam 324 extends along the longitudinal direction L. The beam 324 has a first surface 325 and a second surface 326 opposite the first surface 325 in the height direction H.

The outer contact 310 is formed of a conductive material, such as a sheet metal. In the embodiment shown in FIG. 3, the outer contact 310 is monolithically formed in a single piece from the sheet metal. In another embodiment, the outer contact 310 may be formed of a plurality of pieces assembled together.

The diecast 330, as shown in FIGS. 1 and 2, is formed of a first diecast half 332 and a second diecast half 332' that are attached together along the height direction H. The first diecast half 332 and the second diecast half 332' are identical to one another. The first diecast half 332 will be described in detail with reference to FIGS. 4 and 5 but applies equally to the second diecast half 332'; all elements of the second diecast half 332' that correspond to elements of the first diecast half 332 have the same reference number and the same corresponding description with respect to FIGS. 4 and 5, with an added apostrophe for the elements of the second diecast half 332' where they appear in the other figures for differentiation.

Figure 4:
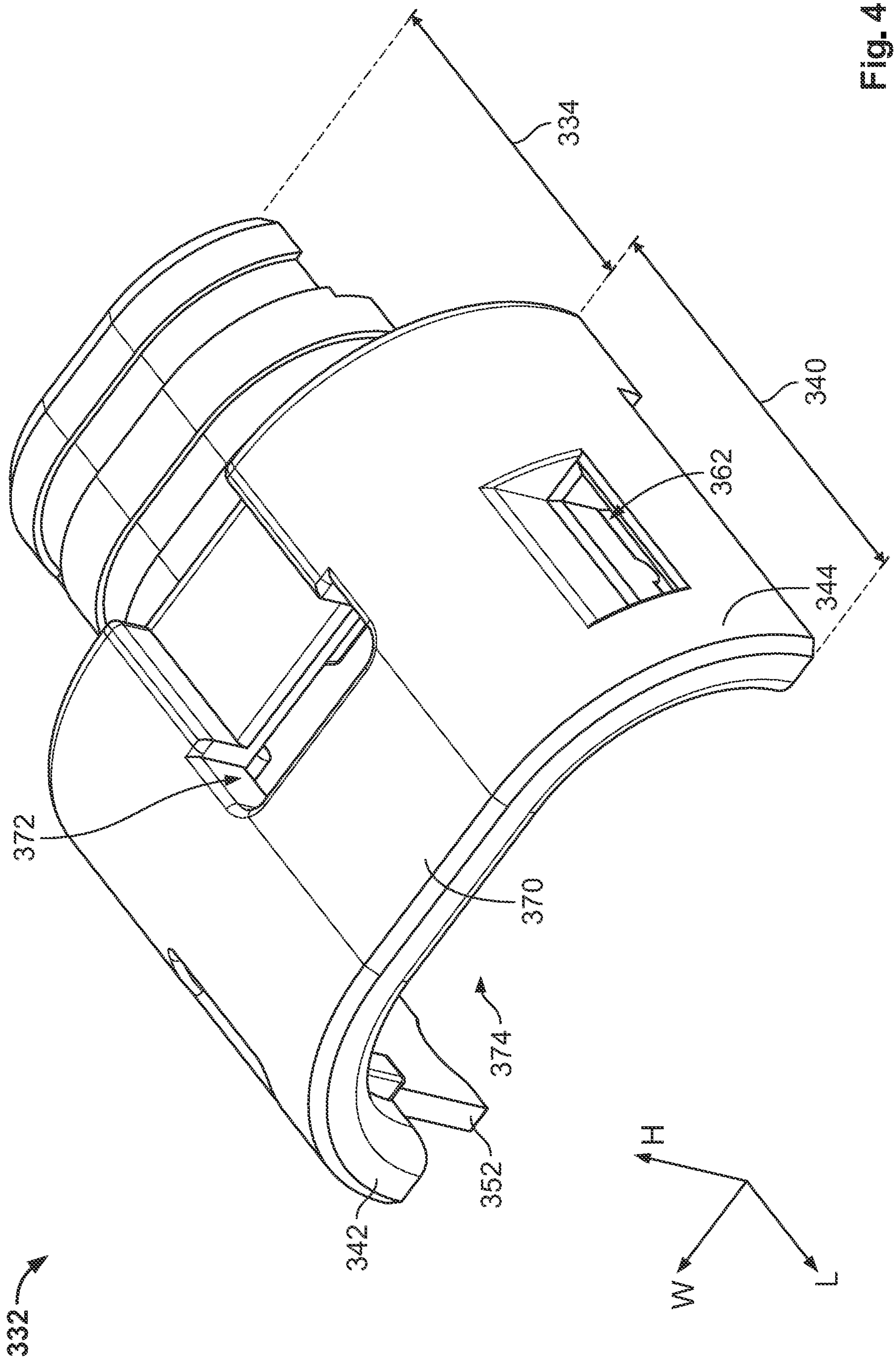
FIG. 4 is a top perspective view of a diecast half of the shield of the connector system.
Figure 5:
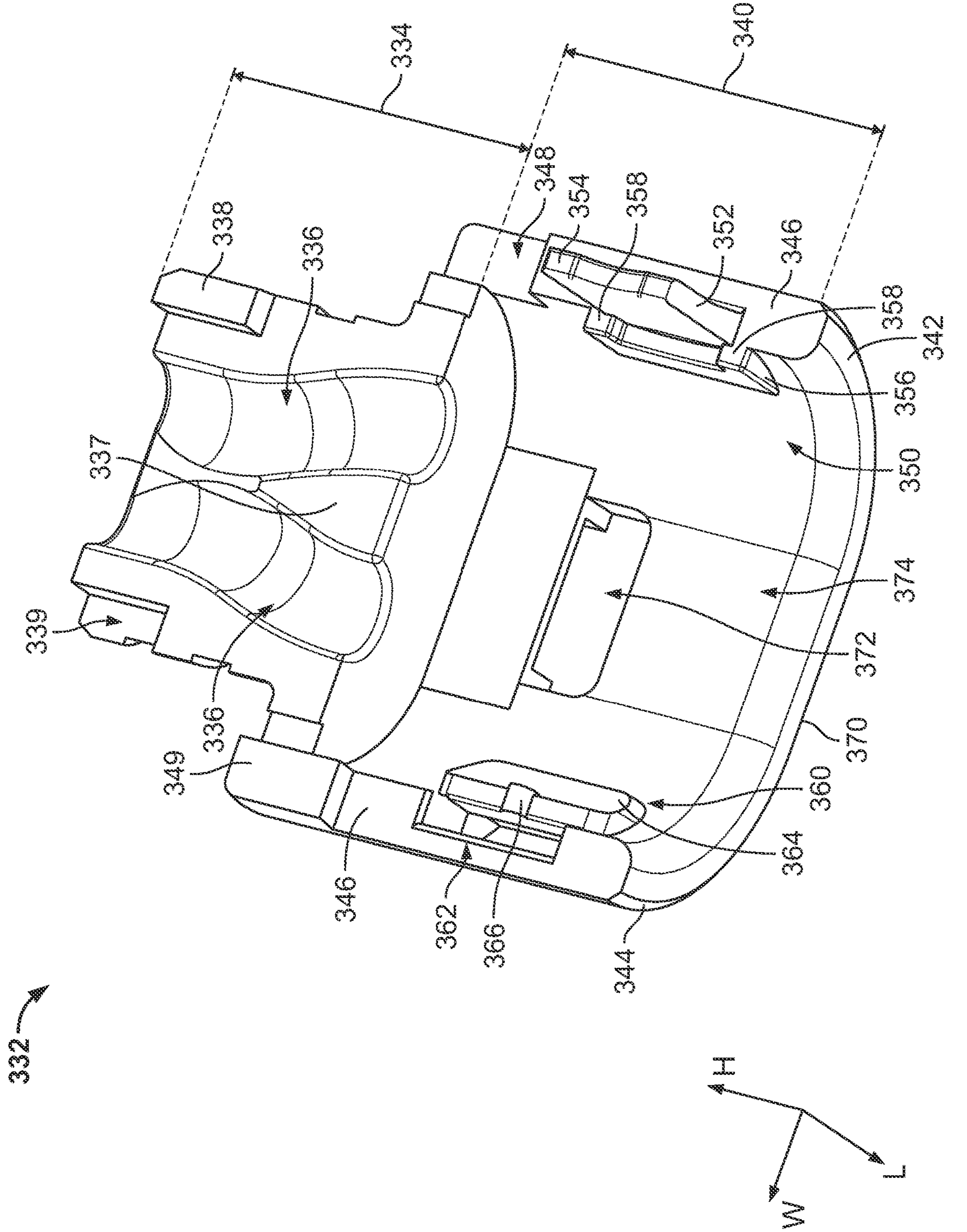
FIG. 5 is a bottom perspective view of the diecast half.

The first diecast half 332, as shown in FIGS. 4 and 5, has a wire section 334 and a termination section 340 extending from the wire section 334 along the longitudinal direction L.

The wire section 334, as shown in FIG. 5, has a pair of wire passageways 336 extending through the wire section 334 along the longitudinal direction L. In the shown embodiment, the wire section 334 has a separation protrusion 337 disposed between the wire passageways 336 and progressively separating the wire passageways 336 further from one another in a width direction W perpendicular to the longitudinal direction L and the height direction H; the wire passageways 336 are progressively further from one another closer to the termination section 340 along the longitudinal direction L in this embodiment. In another embodiment, the separation protrusion 337 can be omitted.

The wire section 334 has a wire section key 338 on one side of the wire section 334 and a wire section keyway 339 on an opposite side of the wire section 334 in the width direction W. The wire section key 338 and the wire section keyway 339 correspond to one another in size and shape.

As shown in FIGS. 4 and 5, the termination section 340 has a first side 342, a second side 344 opposite the first side 342 in the width direction W, and a cover 370 extending between the first side 342 and the second side 344. The first side 342, the second side 344, and the cover 370 define a termination space 374 of the termination section 340. A bottoming surface 346 of the first diecast half 332 is formed by an exterior surface of the first side 342 and an exterior surface of the second side 344 of the first diecast half 332 facing in the height direction H.

In the termination section 340, as shown in FIG. 5, the first side 342 has a termination section keyway 348 extending into the bottoming surface 346 in the height direction H and the second side 344 has a termination section key 349 extending from the bottoming surface 346 in the height direction H. The termination section keyway 348 corresponds to the termination section key 349 in size and shape.

The first side 342 of the termination section 340, as shown in FIG. 5, has a first termination portion 350. The first termination portion 350 has an arm 352 extending from the bottoming surface 346 in the height direction H with an end 354 positioned opposite the bottoming surface 346. The first termination portion 350 has a first ledge 356 positioned adjacent to the bottoming surface 346 and extending from the first side 342 into the termination space 374. The first ledge 356 has a pair of first nubs 358 facing in the height direction H and positioned at opposite ends of the first ledge 356 in the longitudinal direction L.

The second side 344 of the termination section 340, as shown in FIG. 5, has a second termination portion 360. The second termination portion 360 has an arm passageway 362 extending through the bottoming surface 346 and the second side 344 of the termination section 340 in the height direction H. The arm passageway 362 corresponds in size and shape to the arm 352. The second termination portion 360 has a second ledge 364 positioned adjacent to the bottoming surface 346 and extending from the second side 344 into the termination space 374. The second ledge 364 has a second nub 366 positioned approximately centrally on the second ledge 364.

As shown in FIGS. 4 and 5, the cover 370 has a cover passageway 372 extending through the cover 370 in the height direction H. In another embodiment, the cover passageway 372 can be omitted and the cover 370 can be solid between the first side 342 and the second side 344.

The first diecast half 332 is formed of a conductive material. In the shown embodiment, the first diecast half 332 is monolithically formed in a single piece from the conductive material. Although the first diecast half 332 is referred to as a "diecast" in the embodiments herein, the first diecast half 332 is not necessarily produced by inserting liquid conductive material into a mold, but could alternatively be formed in a plurality of pieces of conductive material and assembled together to form the first diecast half 332 as described herein, or formed according to any other manufacturing method that can produce the first diecast half 332 described herein.

The inner ferrule 390 and the outer ferrule 392 are each an approximately cylindrical element formed of a conductive material, as shown in FIGS. 1 and 2. The inner ferrule 390 and the outer ferrule 392 are each plastically deformable circumferentially to form a crimp connection, as described in greater detail below.

In the embodiment shown in FIGS. 1, 2, and 9, the cable 400 is a shielded twisted pair cable and includes a pair of wires 410 each having a conductor 414 and an inner insulation 412 surrounding the conductor 414. The wires 410 extend next to one another and are surrounded by a braid 420, which is formed of a conductive material. The braid 420 is surrounded by an outer insulation 430. In other embodiments, the cable 400 could have a single wire 410 with a single conductor 414, or the cable 400 could be any other type of cable used in electrical connectors The cable 400 may also have additional components not shown in the present drawings, such as other foils and fillers.

The assembly of the connector system 10 will now be described in greater detail primarily with reference to FIGS. 1, 2, and 6-9.

The inner contacts 200 are each positioned in one of the contact passageways 110 of the dielectric 100, as shown in FIG. 9. The mating end 210 of each of the inner contacts 200 is positioned adjacent to an end of the dielectric 100 in the longitudinal direction L.

The shield 300 is disposed around the dielectric 100. As shown in FIGS. 1, 2, and 9, the outer contact 310 is positioned around the dielectric 100 and, in the embodiment shown in FIG. 2, the dielectric protrusions 120 extending from the dielectric 100 are each positioned in one of the shield recesses 322 of the outer contact 310 to positionally secure the outer contact 310 around the dielectric 100. In another embodiment in which the dielectric protrusions 120 and the shield recesses 322 are omitted, the outer contact 310 can be positioned without these elements in the same relative position around the dielectric 100.

Figure 6:
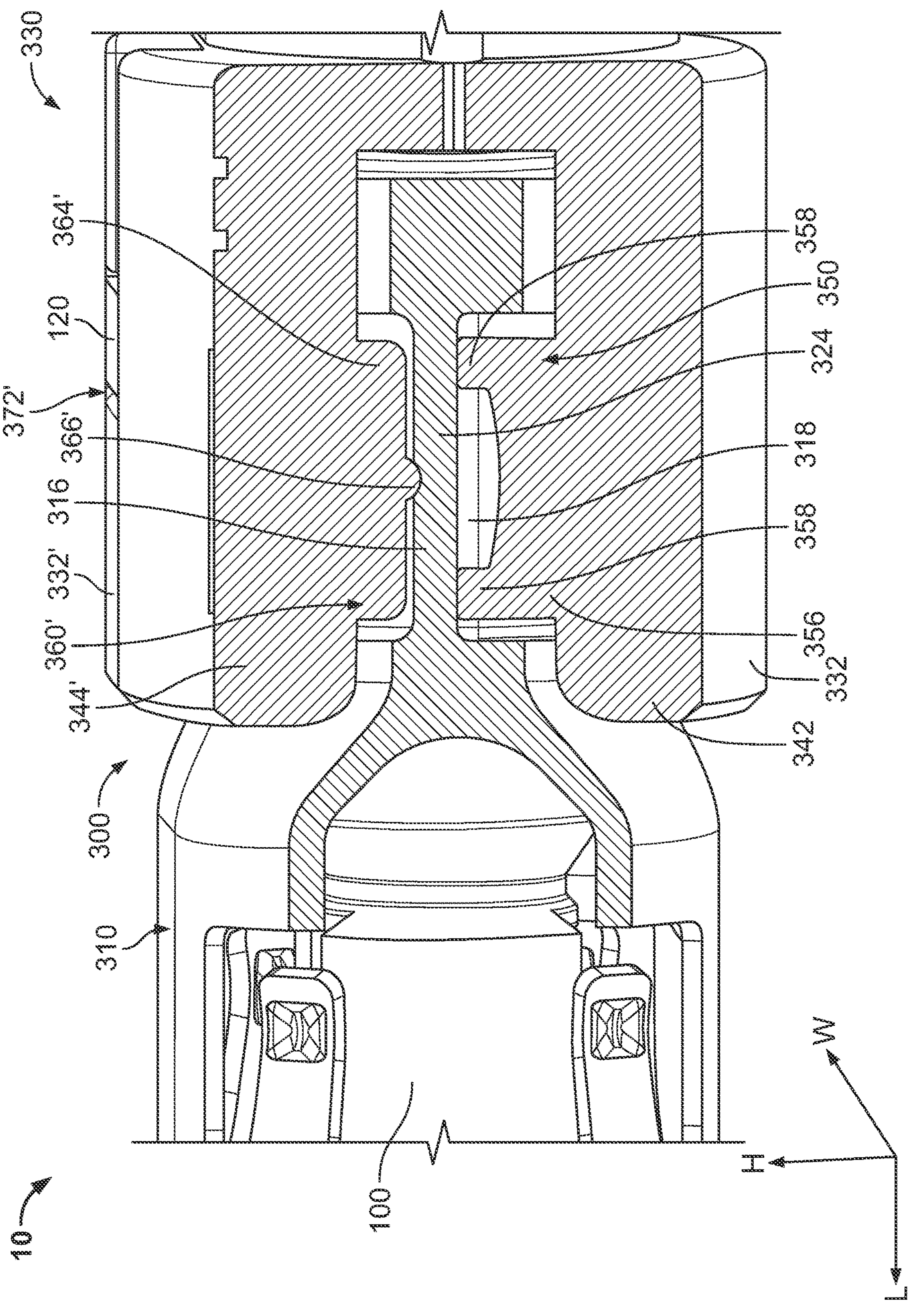
FIG. 6 is a sectional side view of the connector system prior to reaching a terminated position.

After the outer contact 310 is positioned around the dielectric 100, one of the first diecast half 332 and the second diecast half 332' of the diecast 330 is positioned around the outer contact 310. In the embodiment shown in FIG. 6, the first diecast half 332 is positioned on a bottom side of the outer contact 310 in the height direction H. The first ledge 356 of the first termination portion 350 of the first diecast half 332 contacts one of the beams 324 of the outer contact 310. As shown in FIG. 6, the first nubs 358 abut on the lower surface 318 of the beam 324.

With the first diecast half 332 on the outer contact 310, the cable 400 is positioned to extend through the first diecast half 332 and the outer contact 310 of the shield 300 into the dielectric 100, as shown in FIG. 9. The outer insulation 430 is stripped from a portion of the cable 400 and the braid 420 is bent back; the wires 410 extend through the wire passageways 336 into the dielectric 110. In the shown embodiment, the wires 410 are separated by the wire passageways 336 and the separation protrusion 337. A portion of the inner insulation 412 of each of the wires 410 is stripped and the conductor 414 of each of the wires 410 is electrically and mechanically connected with the connection end 220 of one of the inner contacts 200.

In the embodiment shown in FIGS. 1 and 6, the second diecast half 332' is then positioned on a top side of the outer contact 310 in the height direction H. As the second diecast half 332' is positioned, as shown in FIG. 1, the arm 352 of the first termination portion 350 of the first diecast half 332 moves into the arm passageway 362' of the second termination portion 360' of the second diecast half 332'. The termination section key 349' on the second side 344' of the second diecast half 332' is received in the termination section keyway 348 on the first side 342 of the first diecast half 332 to further align the first diecast half 332 and the second diecast half 332', as shown in FIG. 1. Likewise, the wire section key 338 of the first diecast half 332 is received in the wire section keyway 339' of the second diecast half 332'.

When the second diecast half 332' reaches the position shown in FIG. 6, the second ledge 364' of the second termination portion 360' of the second diecast half 332' contacts the same beam 324 of the outer contact 310 as the first termination portion 350 of the first diecast half 332. The second nub 366' abuts on the upper surface 316 of the beam 324. The wires 410 of the cable 400 are received in the wire passageways 336' of the second diecast half 332' and are separated by the separation protrusion 337' of the second diecast half 332' as similarly described above with respect to the first diecast half 332.

Because the first diecast half 332 and the second diecast half 332' are identical, the alignment and contact of the elements on the side opposite the side shown in FIG. 6 is identical but vertically transposed with respect to the orientation shown in FIG. 6. On the second side 344 of the first diecast half 332 opposite the side shown in FIG. 6, the second ledge 364 of the second termination portion 360 shown in FIG. 5 abuts the lower surface 318 of another beam 324 of the outer contact 310, and the first ledge 356' of the first termination portion 350' of the second diecast half 332' abuts the upper surface 316 of the beam 324. On the second side 344 of the first diecast half 332, the arm passageway 362 of the second termination portion 360 receives the arm 352' of the first termination portion 350' of the second diecast half 332', and the termination section key 349 is received in the termination section keyway 348' of the second diecast half 332'

In the embodiment shown in FIG. 2, when the first diecast half 332 and the second diecast half 332' are positioned around the outer contact 310, one of the dielectric protrusions 120 extends into the cover passageway 372, 372' of the cover 370, 370' of each of the first diecast half 332 and the second diecast half 332'. The dielectric protrusion 120 received in the cover passageway 370, 370' determines a position of the first diecast half 332 and the second diecast half 332'relative to the outer contact 310 and the dielectric 100. In another embodiment in which the dielectric protrusions 120 and the cover passageways 372, 372' are omitted, the first diecast half 332 and the second diecast half 332' can be positioned without these elements in the same relative position around the outer contact 310.

Figure 7:
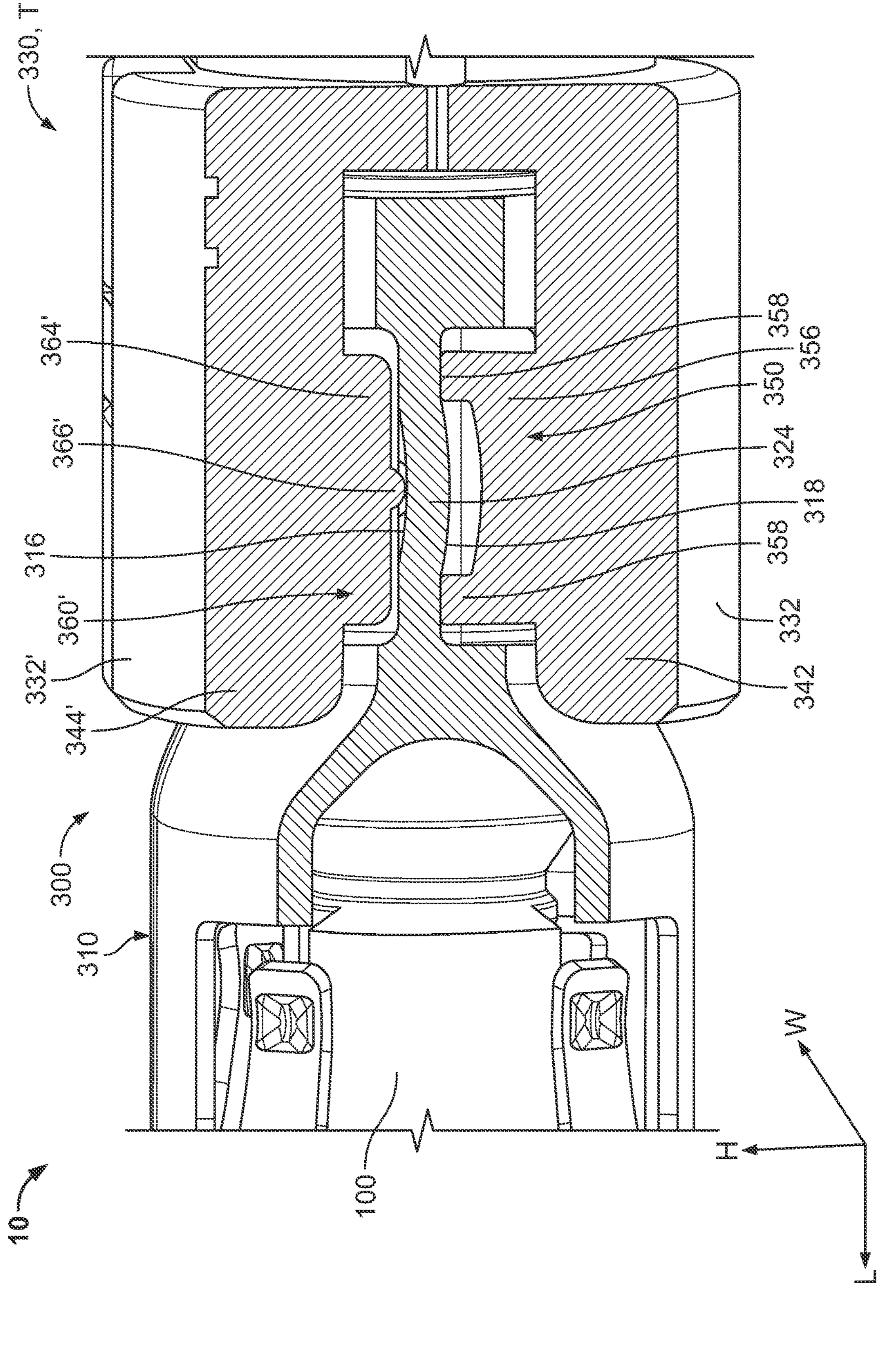
FIG. 7 is a sectional side view of the connector system in the terminated position.
Figure 8:
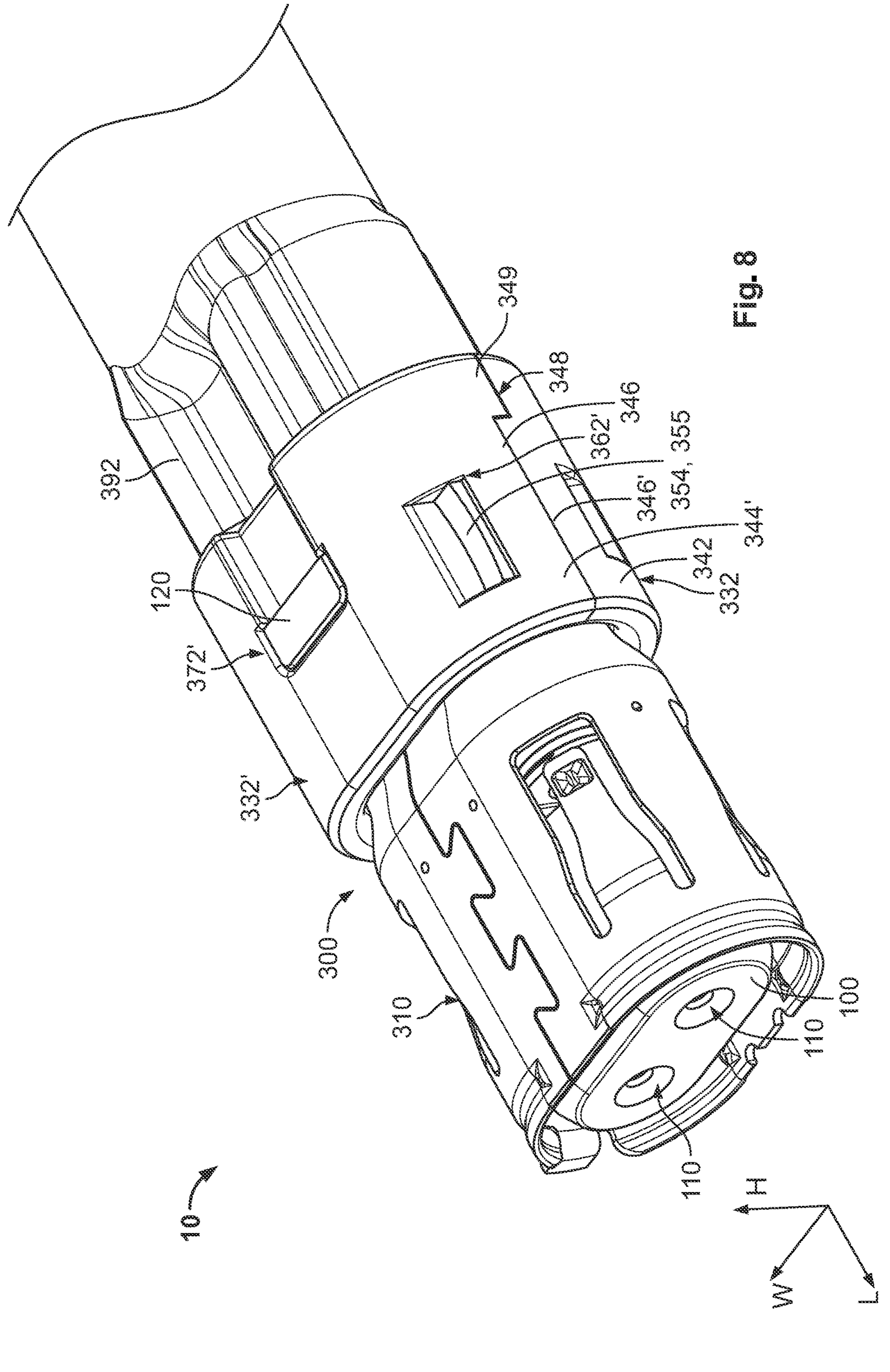
FIG. 8 is a perspective view of the connector system in the terminated position.

The first diecast half 332 and the second diecast half 332' are crimped or compressed from the position shown in FIG. 6 to a terminated position T of the diecast 330 shown in FIG. 7 to mechanically and electrically secure the diecast 330 to the outer contact 310. The first diecast half 332 and the second diecast half 332' are pressed toward one another along the height direction H to reach the terminated position T. The terminated position T is reached when, as shown in FIGS. 1 and 8, the first bottoming surface 346 of the first diecast half 332 abuts the second bottoming surface 346' of the second diecast half 332' along the height direction H.

As shown in FIG. 7, the first diecast half 332 and the second diecast half 332' deform the beam 324 between the first diecast half 332 and the second diecast half 332' in the terminated position T. The beam 324 is deformed between the first termination portion 350 of the first diecast half 332 and the second termination portion 360' of the second diecast half 332'. The beam 324 is held between the first ledge 356 of the first termination portion 350 and the second ledge 364' of the second termination portion 360' in the terminated position T. As shown in FIG. 7, the first nubs 358 and the second nub 366' press on opposite surfaces 316, 318 of the beam 324 in the terminated position T and deform the beam 324. The second nub 366' is positioned between the first nubs 358 along the longitudinal direction L.

On a side of the connector system 10 opposite the side shown in FIG. 7, as similarly described above, the other beam 324 of the outer contact 310 is likewise deformed in a vertically transposed manner to the orientation shown in FIG. 7. The other beam 324 is deformed between the second termination portion 360 of the first diecast half 332 and the first termination portion 350' of the second diecast half 332', with the second nub 366 pressing centrally on the bottom surface 318 of the other beam 324 and the first nubs 358' pressing on outer sides of the upper surface 316 of the other beam 324. The beams 324 on the opposite sides of the outer contact 310 are both plastically deformed between the first diecast half 332 and the second diecast half 332' in the terminated position T, asymmetrically from one another to prevent rotation of the shield 300 during crimping.

To attach the first diecast half 332 and the second diecast half 332' in the terminated position T, as shown in FIG. 7, the end 354 of the arm 352 of the first termination portion 350 is plastically deformed to an expanded dimension 355 that prevents withdrawal of the arm 352 from the arm passageway 362' of the second diecast half 332'. The same securing occurs on the other side of the connector system 10 in a vertically transposed manner.

In the embodiment shown in FIGS. 1 and 6-9, the first diecast half 332 is positioned on a bottom side of the outer contact 310 in the height direction H and the second diecast half 332' is positioned on a top side of the outer contact 310 in the height direction H. Because the diecast halves 332, 332' are identical, they are hermaphroditic and can be attached around the outer contact 310 in a plurality of different orientations, including reversed from the embodiment shown in FIGS. 6-9 with the first diecast half 332 on the top side of the outer contact 310 and the second diecast half 332' on the bottom side of the outer contact 310. The relative positioning and connection of the first diecast half 332 and the second diecast half 332' to form the diecast 330 is the same as described above regardless of the selected orientation.

As shown in FIGS. 2 and 9, the inner ferrule 390 is crimped around the braid 420 of the cable 400 and the braid 420 is bent back over the inner ferrule 390. The outer ferrule 392 is crimped around the wire sections 334, 334' of the first diecast half 332 and the second diecast half 332' and around the cable 400, securing the cable 400 to the diecast 300 and electrically connecting the braid 420 and the elements of the shield 300.

The deformation of the beams 324 in the terminated position T, as shown in FIG. 7, secures a mechanical and electrical connection between the diecast 330 and the outer contact 310. The deformation of the beams 324 is reached, as described above, when the first bottoming surface 346 of the first diecast half 332 abuts the second bottoming surface 346' of the second diecast half 332' along the height direction H. The bottoming of the bottoming surfaces 346, 346' thus ensures that the beams 324 are sufficiently plastically deformed to the position shown in FIG. 7 when the first diecast half 332 is compressed toward the second diecast half 332', but that the beams 324 are not deformed beyond this point due to the abutting bottoming surfaces 346, 346'. The design of the hermaphroditic first diecast half 332 and second diecast half 332' thus ensures that the diecast 330 sufficiently deforms the beams 324 for a strong mechanical and electrical connection to the outer contact 310, but that the beams 324 are not over-deformed in a manner that could impair the functioning of the shield 300. The bottoming surface 346 abuts the second bottoming surface 346' in a lateral plane P that extends approximately centrally through the beams 324, as shown in FIG. 9, which properly aligns the diecast 330 and the outer contact 310 for better performance of the shield 300.

What is claimed is:

1. A shield of a connector system, comprising:

an outer contact having a beam; and a diecast disposed around the outer contact, the diecast has a first diecast half and a second diecast half that are attached together around the outer contact in a terminated position of the diecast, the beam of the outer contact is undeformed in an unterminated position of the diecast, the beam is between the first diecast half and the second diecast half and is deformed by the first diecast half and the second diecast half in the terminated position, a first bottoming surface of the first diecast half abuts a second bottoming surface of the second diecast half in the terminated position.

2. The shield of claim 1, wherein the first diecast half and the second diecast half are identical and can be attached around the outer contact in a plurality of different orientations.

3. The shield of claim 1, wherein the first diecast half has a first termination portion on a first side of the first diecast half and the second diecast half has a second termination portion on a second side of the second diecast half, the beam of the outer contact is deformed between the first termination portion and the second termination portion in the terminated position.

4. The shield of claim 3, wherein the first termination portion has a first ledge positioned adjacent to the first bottoming surface of the first diecast half.

5. The shield of claim 4, wherein the second termination portion has a second ledge positioned adjacent to the second bottoming surface of the second diecast half, the beam of the outer contact is held between the first ledge and the second ledge in the terminated position.

6. The shield of claim 5, wherein the first ledge has a pair of first nubs and the second ledge has a second nub, the first nubs and the second nub press on opposite surfaces of the beam in the terminated position.

7. The shield of claim 6, wherein the second nub is positioned between the first nubs along a longitudinal direction of the shield.

8. The shield of claim 3, wherein the first termination portion has an arm extending from the first bottoming surface of the first diecast half.

9. The shield of claim 8, wherein the second termination portion has an arm passageway extending through the second bottoming surface and the second side of the second diecast half.

10. The shield of claim 9, wherein the arm is positioned to extend through the arm passageway in the terminated position.

11. The shield of claim 10, wherein an end of the arm is plastically deformed to an expanded dimension to attach the first diecast half to the second diecast half in the terminated position.

12. The shield of claim 3, wherein the first termination portion and the second termination portion abut on opposite surfaces of the beam and deform the beam.

13. The shield of claim 3, wherein the first diecast half has a keyway extending into the first bottoming surface and the second diecast half has a key extending from the second bottoming surface and positioned in the keyway in the terminated position.

14. The shield of claim 1, wherein the beam is one of a pair of beams of the outer contact, the beams are positioned on a pair of opposite sides of the outer contact and are both deformed between the first diecast half and the second diecast half in the terminated position.

15. The shield of claim 1, wherein the first bottoming surface abuts the second bottoming surface in a lateral plane that extends approximately centrally through the beam.

16. The shield of claim 1, wherein the beam is positioned between a pair of openings that extend through the outer contact.

17. The shield of claim 1, wherein the beam of the outer contact is bent by the first diecast half and the second diecast half in the terminated position.

18. The shield of claim 17, wherein the beam of the outer contact has a linear shape in the unterminated position.

19. A connector system, comprising:

a dielectric; and a shield disposed around the dielectric, the shield including an outer contact and a diecast disposed around the outer contact, the outer contact has a beam, the beam of the outer contact is undeformed in an unterminated position of the diecast, the diecast has a first diecast half and a second diecast half that are attached together around the outer contact in a terminated position of the diecast, the beam of the outer contact is between the first diecast half and the second diecast half and is deformed by the first diecast half and the second diecast half in the terminated position, a first bottoming surface of the first diecast half abuts a second bottoming surface of the second diecast half in the terminated position.

20. The connector system of claim 19, wherein the first diecast half and the second diecast half each have a termination section and a wire section extending from the termination section, the beam is deformed between the termination sections of the first diecast half and the second diecast half.

21. The connector system of claim 20, further comprising a plurality of inner contacts disposed in the dielectric and a cable extending through the shield into the dielectric to electrically and mechanically connect with the inner contacts.

22. The connector system of claim 21, wherein the cable has a pair of wires in the wire sections of the first diecast half and the second diecast half.

23. A shield of a connector system, comprising:

an outer contact having a beam; and a diecast disposed around the outer contact, the diecast has a first diecast half and a second diecast half that are attached together around the outer contact and connected to the outer contact in a terminated position of the diecast, the first diecast half has a first bottoming surface and a first termination portion on a first side of the first diecast half, the first termination portion has an arm extending from the first bottoming surface of the first diecast half and a first ledge adjacent to the first bottoming surface, the second diecast half has a second bottoming surface and a second termination portion on a second side of the second diecast half, the second termination portion has a second ledge adjacent to the second bottoming surface and an arm passageway extending through the second bottoming surface and the second side of the second diecast half, the arm extends through the arm passageway in the terminated position, an end of the arm is plastically deformed to an expanded dimension to attach the first diecast half to the second diecast half in the terminated position, the first ledge and the second ledge are spaced apart in the terminated position in which the first bottoming surface abuts the second bottoming surface, the beam of the outer contact is held between the first ledge and the second ledge in the terminated position.

24. The shield of claim 23, wherein the end of the arm has an at least partially concave shape prior to the plastic deformation.

25. The shield of claim 23, wherein the first diecast half and the second diecast half are identical.

26. The shield of claim 25, wherein the first diecast half and the second diecast half are attachable around the outer contact in a hermaphroditic manner.

27. The shield of claim 23, wherein the first diecast half has another second termination portion identical to the second termination portion of the second diecast half on a second side of the first diecast half.

28. The shield of claim 27, wherein the second diecast half has another first termination portion identical to the first termination portion of the first diecast half on a first side of the second diecast half.

29. The shield of claim 28, wherein an arm of the another first termination portion extends through an arm passageway of the another second termination portion in the terminated position and is plastically deformed to attach the first diecast half to the second diecast half.

30. The shield of claim 23, wherein the beam of the outer contact is deformed by the first diecast half and the second diecast half in the terminated position.

31. A shield of a connector system, comprising:

an outer contact; and a diecast disposed around the outer contact, the diecast has a first diecast half and a second diecast half that are attached together around the outer contact in a terminated position of the diecast, the first diecast half has a first bottoming surface and a first termination portion having a first ledge positioned adjacent to the first bottoming surface, the second diecast half has a second bottoming surface and a second termination portion having a second ledge positioned adjacent to the second bottoming surface, in the terminated position a beam of the outer contact is held between the first ledge and the second ledge, the first diecast half and the second diecast half deform the beam of the outer contact between the first diecast half and the second diecast half, and the first bottoming surface abuts the second bottoming surface.

* * * * *